R. HAMMERLY.
NECKTIE HOLDER.
APPLICATION FILED JUNE 26, 1917.
1,256,477.
Patented Feb. 12, 1918.
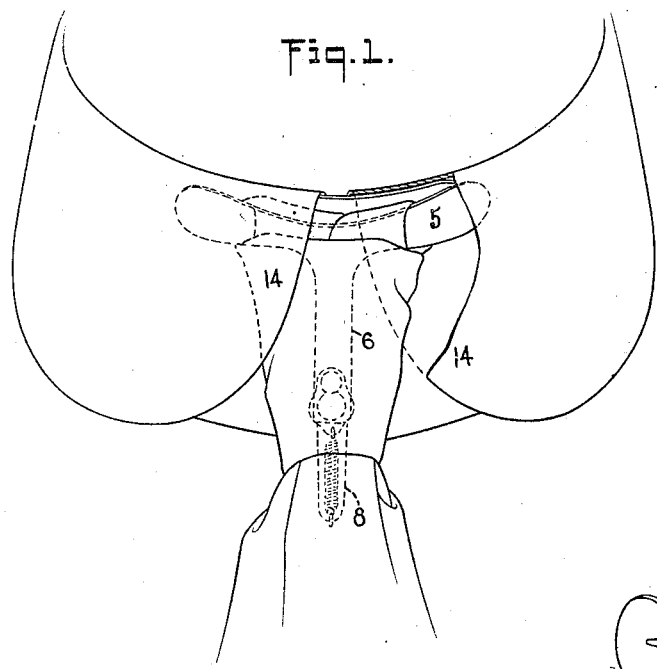
Fig. 1.
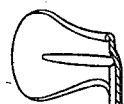
Fig. 4.
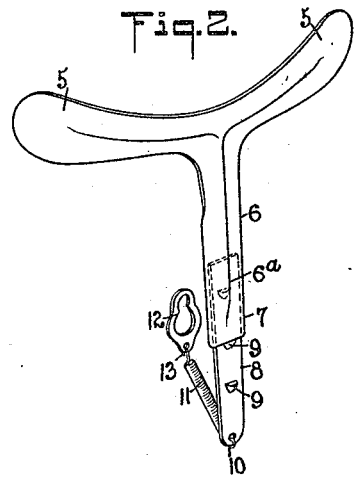
Fig. 2.
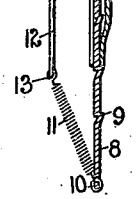
Fig. 3.
WITNESSES
INVENTOR
R. Hammerly
BY 
ATTORNEYS

UNITED STATES PATENT OFFICE.

RICHARD HAMMERLY, OF NEW YORK, N. Y.

NECKTIE-HOLDER.

1,256,477.

Specification of Letters Patent.

Patented Feb. 12, 1918.

Application filed June 26, 1917. Serial No. 176,993.

*To all whom it may concern:*

Be it known that I, RICHARD HAMMERLY, a citizen of the United States, and a resident of Union Course, in the city of New York, borough of Queens, county of Queens, and State of New York, have invented a new and Improved Necktie-Holder, of which the following is a full, clear, and exact description.

My invention has for its object to provide a necktie holder having wings which may be disposed under a collar and a depending shank with a guideway in which an extension is disposed, and to which an eye is connected by a spring.

Additional objects of the invention will appear in the following specification, in which the preferred form of the invention is disclosed.

In the drawings similar reference characters denote similar parts in all the views, in which—

Figure 1 is a perspective view illustrating the manner in which my necktie holder is used, part of the collar being broken away to better show the construction;

Fig. 2 is a perspective view of the necktie holder;

Fig. 3 is a vertical sectional view of the necktie holder; and

Fig. 4 is a transverse sectional view of the necktie holder showing the shank and extension.

Referring to the drawings, it will be seen that the necktie holder is constructed with wings 5 and a shank 6 having guideways 7 in which an extension 8 is disposed. The extension 8 is provided with teeth 9 for engaging the bottom of the shank 6 to limit the inward movement of the extension 8 after it has been drawn downwardly and outwardly. To the extension 8 there is secured at 10 a spring 11, an eye 12 being secured to the spring 11 at 13.

In using the invention, a necktie or piece of goods may be disposed around the shank 6 and the wings 5, after which the wings 5 may be disposed under the collar ends 14, and the eye 12 may be disposed over the collar button which is used to connect the collar ends. The extension 8 is then drawn downwardly, while the shank 6 is held upwardly with the wings 5 in position, the extension 8 being drawn downwardly to a point where the spring 11 will afford the desired resiliency to keep the wings 5 in position respectively to the collar without reference to the style of collar which may be worn.

The shank 6 has a groove $6^a$, the lower end of which is spaced from the bottom of the shank; the teeth 9 moving in this groove until they spring under the bottom of tne shank.

Having thus described my invention, I claim as new and desire to secure by Letters Patent:

In a necktie holder having wings and a depending shank with a guideway, an extension disposed in the guideway and having means to limit its inward movement relatively to the shank, an eye, and a spring connecting the extension and the eye for the purpose specified.

RICHARD HAMMERLY.

Copies of this patent may be obtained for five cents each, by addressing the "Commissioner of Patents, Washington, D. C."